United States Patent
Jen

(10) Patent No.: US 8,537,702 B2
(45) Date of Patent: Sep. 17, 2013

(54) METHOD OF HANDLING DOWNLINK SIGNALING AND RELATED COMMUNICATION DEVICE

(75) Inventor: Yu-Chih Jen, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 476 days.

(21) Appl. No.: 12/821,155

(22) Filed: Jun. 23, 2010

(65) Prior Publication Data

US 2010/0322097 A1    Dec. 23, 2010

Related U.S. Application Data

(60) Provisional application No. 61/219,397, filed on Jun. 23, 2009.

(51) Int. Cl.
*G08C 15/00*    (2006.01)

(52) U.S. Cl.
USPC .......................................... 370/252; 370/332

(58) Field of Classification Search
USPC ............... 370/241, 252, 310, 315, 316, 319, 370/321, 322, 328, 329, 331, 332, 340, 341, 370/431, 437; 455/403, 422.1, 456.1
See application file for complete search history.

(56) References Cited

U.S. PATENT DOCUMENTS

| | | | |
|---|---|---|---|
| 2007/0298806 A1* | 12/2007 | Venkatachalam | 455/450 |
| 2009/0042532 A1 | 2/2009 | Bienas | |
| 2009/0073958 A1 | 3/2009 | Xu | |
| 2009/0074090 A1* | 3/2009 | Xu et al. | 375/260 |
| 2009/0103497 A1 | 4/2009 | Fernandez-Corbaton | |
| 2010/0075706 A1* | 3/2010 | Montojo et al. | 455/513 |
| 2010/0120443 A1* | 5/2010 | Ren | 455/450 |
| 2010/0260151 A1* | 10/2010 | Onggosanusi et al. | 370/336 |
| 2010/0322185 A1* | 12/2010 | Park et al. | 370/331 |
| 2011/0235730 A1* | 9/2011 | Noh et al. | 375/260 |

FOREIGN PATENT DOCUMENTS

| | | |
|---|---|---|
| CN | 101120563 A | 2/2008 |
| CN | 101370227 A | 2/2009 |

OTHER PUBLICATIONS

Office action mailed on Aug. 31, 2012 for the China application No. 201010220873.5, filed Jun. 23, 2010, p. 1-7.

3GPP TS 25.305 V8.1.0 (Dec. 2008) 3rd Generation Partnership Project; Technical Specification Group Radio Access Network; Stage 2 functional specification of User Equipment (UE) positioning in UTRAN (Release 8).

3GPP TR 36.814 V0.4.1(Feb. 2009) 3rd Generation Partnership Project; Technical Specification Group Radio Access Network; Further Advancements for E-UTRA Physical Layer Aspects (Release 9).

Ericsson, ALU, Huawei, LGE, Motorola, Nokia, Nokia Siemens Networks, Nortel, Qualcomm, Samsung, 3GPP R1-091648 Way forward on OTDOA positioning, Mar. 2009.

3GPP TS 36.211 V8.7.0 (May 2009) 3rd Generation Partnership Project; Technical Specification Group Radio Access Network; Evolved Universal Terrestrial Radio Access (E-UTRA); Physical Channels and Modulation (Release 8).

* cited by examiner

*Primary Examiner* — Obaidul Huq
(74) *Attorney, Agent, or Firm* — Winston Hsu; Scott Margo

(57) ABSTRACT

A method of handling downlink signaling for a mobile device in a wireless communications system is disclosed. The method comprises t receiving at least one DL reference signal by at least one antenna port configured by a network and measuring the received at least one DL reference signal for a channel quality measurement, demodulation channel estimation, or a positioning measurement, wherein the resource for the at least one DL reference signal is dynamically or semi-statically assigned and configured to the mobile device.

4 Claims, 8 Drawing Sheets

METHOD OF HANDLING DOWNLINK SIGNALING AND RELATED COMMUNICATION DEVICE

CROSS REFERENCE TO RELATED APPLICATIONS

This application claims the benefit of U.S. Provisional Application No. 61/219,397, filed on Jun. 23, 2009 and entitled "Method and Apparatus for enhancing reference signal measurement and HARQ consideration" the contents of which are incorporated herein.

BACKGROUND OF THE INVENTION

1. Field of the Invention

A method used in a wireless communications system and related communication device are disclosed, and more particularly to, a method of handling downlink signaling in a wireless communications system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

Generally, the UE performs measurements for positioning, channel quality indication and mobility. Measurement is done by monitoring various types of reference signals. Positioning Support in LTE has been agreed as a working item in 3GPP RAN Plenary meeting #42 and is focusing on the downlink terrestrial positioning method where one objective is that positioning for LTE access needs to be as good as or better than that currently possible for other access types. In addition, all new features and capabilities shall be backward compatible with networks and UEs that support Rel-8 LTE and Evolved packet System (EPS). An Observed Time Difference of Arrival (OTDA) is specified as a method for positioning. The OTDOA measurement is based on the arrival time difference from different cells observed/measured at the UE. The accuracy of position estimates depend on the precision of timing measurements.

OTDOA time difference measurement is based on a reference signal (RS) and there should be an ability to provide assistance data to the UE containing at least physical cell identities (PCIs) of candidate cells for measurement, relative transmission timing of PCI candidates to a serving cell, and the candidate cell set may be different from the neighbor cells considered for handover. On the other hand, positioning subframes are based on normal subframe with no data or MBSFN subframe with no data and/or RS in the data region while semi-statically configuring positioning subframe for cells/group of cells where UE with positioning subframes can assume aligned, partially or non aligned positioning subframes from all cells as indicated in the assistance information.

A long term evolution-advanced (LTE-A) system, as its name implies, is an evolution of the LTE system, considering relaying for cost-effective throughput enhancement and coverage extension. For example, a relay can be deployed at the cell edge where the eNB is unable to provide required radio quality/throughput for the UEs or at certain location where radio signals of the eNB cannot cover. The LTE-A system can support a wider bandwidth up to 100 MHz to satisfy requirement for peak data rate. Coordinated multi-point (CoMP) transmission/reception is considered for the LTE-A as a tool to improve the coverage of high data rates, the cell-edge throughput and/or to increase system throughput. The main idea of the CoMP transmission/reception is as follows: when a UE is in the cell-edge region, it may be able to receive signals from multiple cell sites and the transmission of the UE may be received at multiple cell sites regardless of the system load. Given that, if the signaling transmitted from the multiple cell sites is coordinated, the DL performance can be increased significantly. This coordination can be simple as in the techniques that focus on interference avoidance or more complex as in the case where the same data is transmitted from multiple cell sites. For the UL, since the signal can be received by multiple cell sites, if the scheduling is coordinated from the different cell sites, the system can take advantage of this multiple reception to significantly improve the link performance.

Dedicated reference signal (DRS) is used at a specific antenna port and a transmission mode for demodulation. For a UE in a radio resource control connection mode and/or CoMP operation, it is time-inefficient to read positioning configuration and wait for positioning RS opportunity. For channel quality measurement, channel state information reference signal (CSI-RS) is expected to improve measurement accuracy in LTE-A. However, the CSI-RS location is not defined for LTE-A. Without careful design and scheduling, radio resource could be wasted and interference is caused.

A Hybrid Automatic Repeat-request (HARQ) operation, done in combination between a media access control (MAC) layer and a physical (PHY) layer, retransmits transport blocks (TBs) for error recovery. The PHY layer performs the retention and re-combination (incremental redundancy) and the MAC layer performs the management and processing negative acknowledgement/acknowledgement (NACK/ACK) signaling. Two HARQ feedbacks (NACK/ACK) indicate whether the eNB has correctly received a transmission on physical uplink share channel (PUSCH). When the NACK is received, or when a certain time elapses without receiving any feedback, the transmitter retransmission the transport block. A measurement gap disturbs the HARQ feedback reception in two different ways: either the transmission of the previous feedback could not take place because of the measurement gap or the previous transmission itself could not take place because of the measurement gap. Those two cases are respectively handled by the two following rules:

1) if a previous transmission takes place but its HARQ feedback cannot be received because of a measurement gap: consider the HARQ feedback as an ACK; and 2) if the measurement gap occulted the previous transmission itself: refer to the last received HARQ feedback.

In the LTE system, a measurement gap is 6 ms at DL and 7 ms at UL with occurrence periodicity of 40 ms or 80 ms. If 3 ms is assumed for UE processing time, 9 ms or 10 ms in total should be considered. For half duplex with 4 ms fixed pattern for uplink/downlink, it is the most likely the measurement gap collide with one or more (re)transmission. However, the current specification only deals with one (re)transmission and/or its corresponding HARQ feedback. On the other hand, it has been unknown what happens to the initial transmission itself which collides with measurement gap since no previous HARQ feedback is referred for (non-adaptive) retransmission opportunity.

SUMMARY OF THE INVENTION

A method of handling downlink signaling for a mobile device in a wireless communications system is disclosed to dynamically assign resource for downlink reference signals.

A method of handling downlink signaling for a mobile device in a wireless communications system is disclosed. The method comprises receiving at least one downlink (DL) reference signal by at least one antenna port configured by a network; and measuring the received at least one DL reference signal for a channel quality measurement, demodulation channel estimation, or a positioning measurement, wherein the resource for the at least one DL reference signal is dynamically or semi-statically assigned and configured to the mobile device.

A communication device for handling downlink signaling in a wireless communications system. The communication device comprising: a means for receiving at least one DL reference signal by at least one of the configured antenna ports; and a means for measuring the received at least one DL reference signal for a channel quality measurement, demodulation channel estimation, or a positioning measurement, wherein the resource for the at least one DL reference signal is dynamically or semi-statically assigned and configured to the mobile device.

A method of handling downlink signaling for a network in a wireless communications system is disclosed. The method comprises: assigning resource dynamically or semi-statically of at least one downlink (DL) reference signal, wherein the at least one DL reference signal is used for a channel quality measurement, demodulation channel estimation or a positioning measurement; and transmitting the at least one DL reference signal to a mobile device through at least one antenna port of the network.

A communication device for handling downlink signaling in a wireless communications system is disclosed. The communication device comprises: a means for assigning resource dynamically or semi-statically of at least one downlink (DL) reference signal, wherein the DL reference signal is used for a channel quality measurement, demodulation channel estimation or a positioning measurement; and a means for transmitting the at least one DL reference signal to a mobile device through at least one antenna port of the network.

A method of handling downlink signaling for a mobile device in a wireless communications system is disclosed. The method comprises: detecting a first downlink (DL) reference signal or a first part of a DL reference signal on a physical downlink share channel (PDSCH) for a channel quality measurement; and detecting a second DL reference signal or a second part of a DL reference signal on a physical downlink control channel (PDCCH) for the channel quality measurement before the detection of the first DL reference signal on the PDSCH is performed.

A method of handling downlink signaling for a mobile device operated in a half-duplex mode in a wireless communications system is disclosed. The method comprises: performing an uplink HARQ transmission; performing a measurement gap before or after the uplink HARQ transmission is performed, wherein the measurement gap is configured by a network; and determining that a first feedback signal of the HARQ uplink transmission is a negative-acknowledgement (NACK), when the measurement gap collides with a period for receiving the first feedback signal of the uplink HARQ transmission.

A communication for handling downlink signaling in a wireless communications system is disclosed. The communication device comprises: a means for performing an uplink HARQ transmission; a means for performing a measurement gap before or after the uplink HARQ transmission is performed, wherein the measurement gap is configured by a network; and a means for determining that a first feedback signal of the HARQ uplink transmission is a negative-acknowledgement (NACK), when the measurement gap collides with a period for receiving the first feedback signal of the uplink HARQ transmission.

A method of handling downlink signaling for a mobile device operated in a half-duplex mode in a wireless communications system is disclosed. The method comprises: performing an uplink HARQ transmission; performing a measurement gap before or after the uplink HARQ transmission is performed, wherein the measurement gap is configured by a network; and determining that a feedback of the uplink HARQ transmission is an acknowledgement (ACK), when an initial transmission or retransmission of the uplink HARQ transmission collides with the measurement gap.

A communication device for handling downlink signaling in a wireless communications system is disclosed. The communication device comprises: a means for performing an uplink HARQ transmission; a means for performing a measurement gap before or after the uplink HARQ transmission is performed, wherein the measurement gap is configured by a network; and a means for determining that a feedback of the uplink HARQ transmission is an acknowledgement (ACK), when an initial transmission or retransmission of the uplink HARQ transmission collides with the measurement gap.

These and other objectives of the present disclosure will no doubt become obvious to those of ordinary skill in the art after reading the following detailed description of the preferred example that is illustrated in the various figures and drawings.

DETAILED DESCRIPTION

Figure 1:
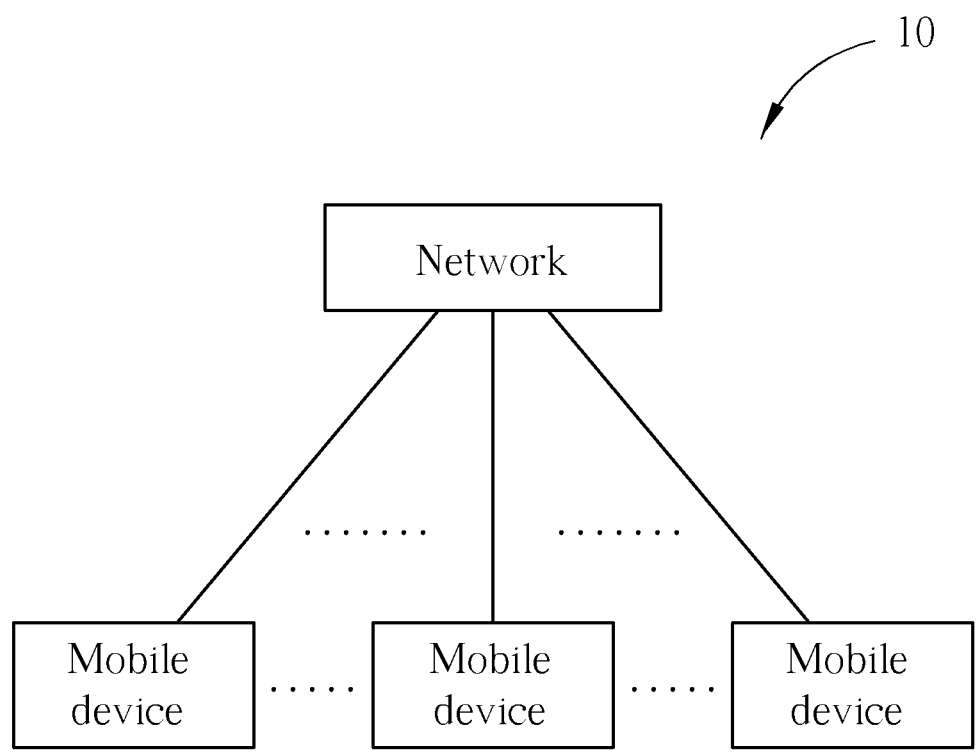
FIG. 1 is a schematic diagram of a wireless communications system according to an example of the present disclosure.

Please refer to FIG. 1, which is a schematic diagram of a wireless communications system 10 according to an example of the present disclosure. The wireless communications system 10, such as an LTE-A (long-term evolution-advanced) system or other mobile communications systems supporting multiple component carriers with which simultaneous data transmission and/or reception can be performed, is briefly composed of a network and a plurality of user equipments (UEs). In FIG. 1, the network and the UEs are simply utilized for illustrating the structure of the wireless communications system 10. Practically, the network comprising a plurality of base stations, such as an E-UTRAN (evolved-UTAN) comprising a plurality of evolved Node-Bs (eNBs) in the LTE-A system. The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
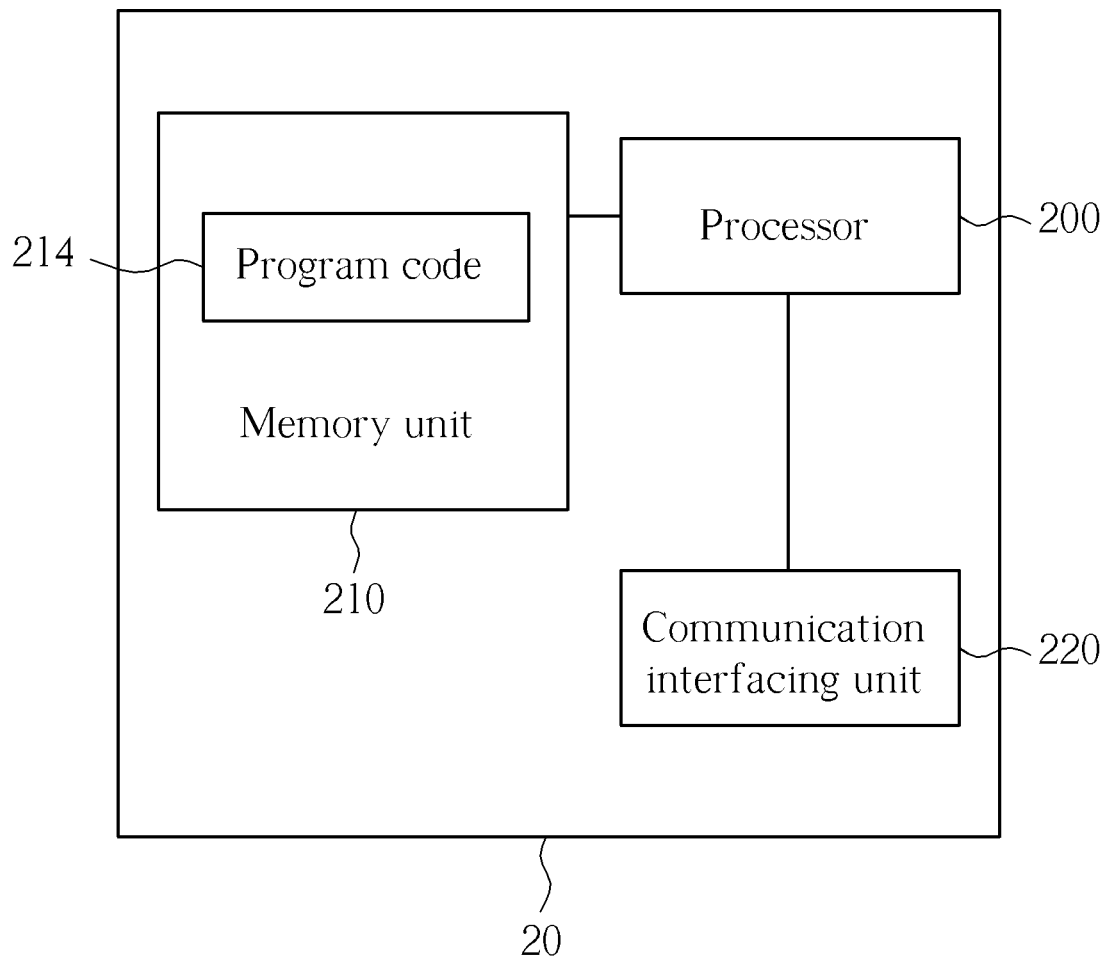
FIG. 2 is a schematic diagram of a communication device according to an example of the present disclosure.

Please refer to FIG. 2, which is a schematic diagram of a communication device 20 according to an example of the present disclosure. The communication device 20 can be the UE or the network shown in FIG. 1 and includes a processor 200, a computer readable recording medium 210 and a communication interfacing unit 220. The computer readable recording medium 210 may be any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver for wirelessly communicating with other communication devices and can transform process results from the processor 200 into radio signals.

Figure 3:
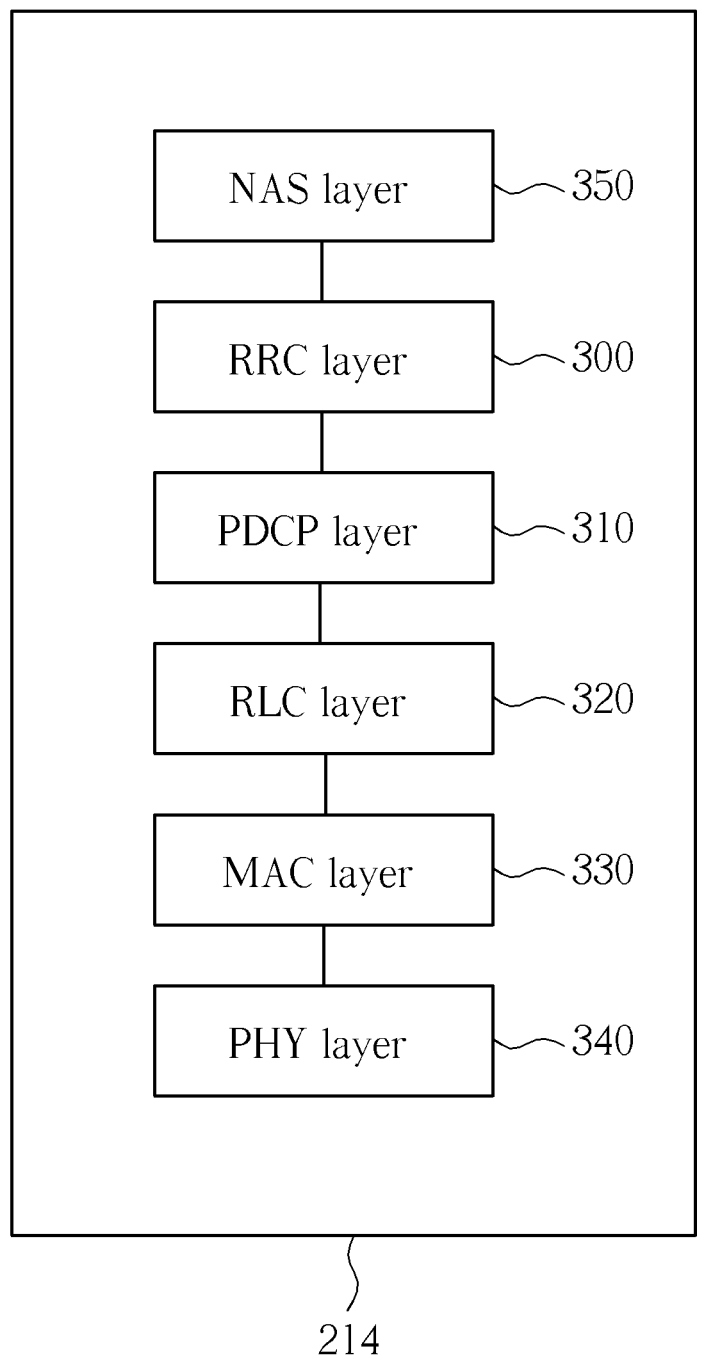
FIG. 3 illustrates a schematic diagram of the program code for the LTE system according to FIG. 2.

Please refer to FIG. 3, which illustrates a schematic diagram of the program code 214 for the LTE system according to an example. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. When the communication device 20 is referred as to the mobile device shown in FIG. 2, the RRC layer 300 of the communication device 20 obtains various measurement results from the MAC layer 330 and the physical layer 340. Transport blocks, delivered from the PHY layer 340 to the MAC layer 330, contains data from the previous radio subframe. The transport blocks may contain multiple or partial packets, depending on scheduling and modulation. A Hybrid Automatic Repeat-request (HARQ) operation, done in combination between the MAC layer 330 and the PHY layer 340, performs a HARQ transmission, retransmitting the transport blocks for error recovery. The PHY layer 340 performs the retention and re-combination (incremental redundancy) and the MAC layer 330 performs the management and signaling. The MAC layer 340 indicates a negative acknowledgement (NACK) when a transport block cyclic redundancy check (CRC) is failed while the PHY layer 340 usually indicates that failure.

Figure 4:
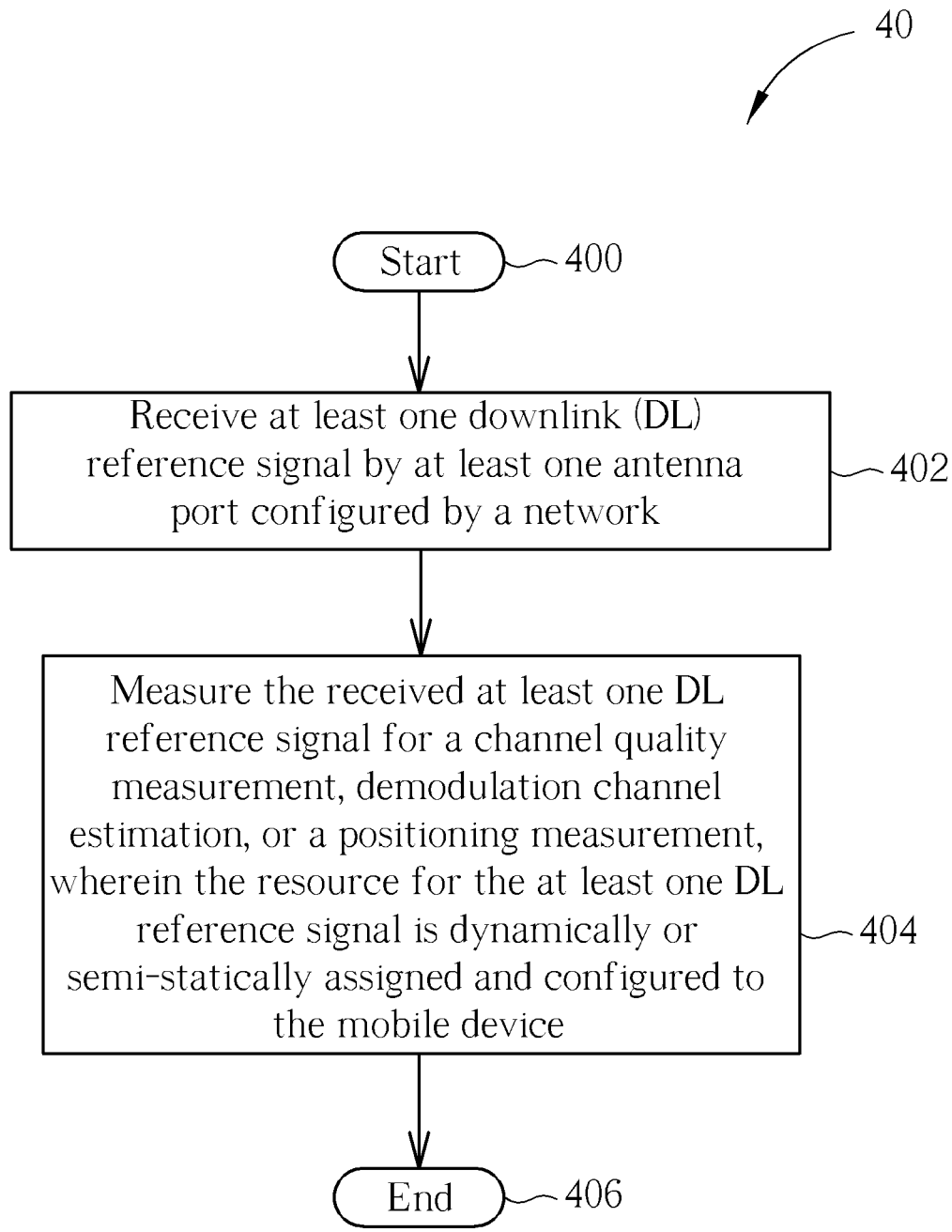
FIG. 4 is a flowchart of a process according to an example of the present disclosure.

Please refer to FIG. 4, which is a flowchart of a process 40 according to an example of the present disclosure. The process 40 is used for handling downlink signaling for a UE in a wireless communications system. Preferably, the wireless communications system can be referred as to the wireless communications system 10 and includes a network and the UE. The process 40 may be complied into the program code 214 and includes the following steps:

Step 400: Start.

Step 402: Receive at least one downlink (DL) reference signal by at least one antenna port configured by a network.

Step 404: Measure the received at least one DL reference signal for a channel quality measurement, demodulation channel estimation, or a positioning measurement, wherein the resource for the at least one DL reference signal is dynamically or semi-statically assigned and configured to the mobile device.

Step 406: End.

According to process 40, the UE may receive one or more DL reference signals by one or more antenna ports. The one or more antenna ports are configured by the network to receive the multiple DL reference signals. Each of the reference signals may be received by one or more antenna ports. Namely, each of the antenna ports is configured to receive one DL reference signals or a part of the DL reference signal. Then, the UE may measure the received DL reference signals for a channel quality measurement, demodulation channel estimation, or a positioning measurement. The resource for the DL reference signals is dynamically or semi-statically assigned and configured to the UE. Preferably, the UE is configured with a coordinated multiple (CoMP) operation, which improves the coverage of high data rates, the cell-edge throughput and/or to increase system throughput. When the UE receives two or more DL reference signals at one configured resource, the UE may use the coding division multiplexing (CDM) scheme to distinguish the reference signal types of the DL reference signals on that configured resource. The CDM scheme allows signals from a series of independent sources to be transmitted at the same time over the same frequency band. This is accomplished by using orthogonal codes to spread each signal over a large, common frequency band. At the receiver, the appropriate orthogonal code is then used again to recover the particular signal intended for a particular user. Therefore, the UE can reduce signaling resource for channel quality measurement and to save time to read positioning configuration or wait for positioning reference signal opportunity.

The reference signals may be UE-specific and configured by a radio resource control (RRC) layer message or a media access control (MAC) layer signaling (e.g. general or semi-static configuration or dynamic scheduling or reconfiguration). In some examples, the MAC layer signaling is a dynamic scheduling or a reconfiguration signaling and the RRC layer message is configuration/reconfiguration message. Each of the configured antenna ports may be associated with a frequency carrier or a cell. Thus, the UE may receive the DL reference signals from one or more antennas, frequency carrier or cell according to configuration of the at least one antenna port and the DL reference signal. Each of the DL reference signals is transmitted with at least of a specific signal pattern and a specific time scheduling (e.g. a given subframe or duration).

In some examples, the aforementioned Observed Time Difference of Arrival (OTDOA) time difference measurement may be adopted for the positioning measurement. The OTDOA measurement is based on the arrival time difference from different cells observed/measured at the UE. The accuracy of position estimates depend on the precision of timing measurements. The related timing of the actual transmissions of the DL reference signals may be used to calculate an estimate of the position and optionally, the velocity of the UE. For example, a serving cell and one or more target cell may schedule transmissions of the DL reference signals with timing difference of +/−½ subframe. Namely, the relative timing of the at least one target cell is provided by the serving cell to the UE according to the scheduling to transmission of the DL reference signal. Certainly, the related transmission of the at least one target cell may be provided according to a fixed timing, a specific pattern or a period signal. In other examples, the relative timing of the target cell may be a value stored in the UE or configured by the network beforehand.

Figure 5:
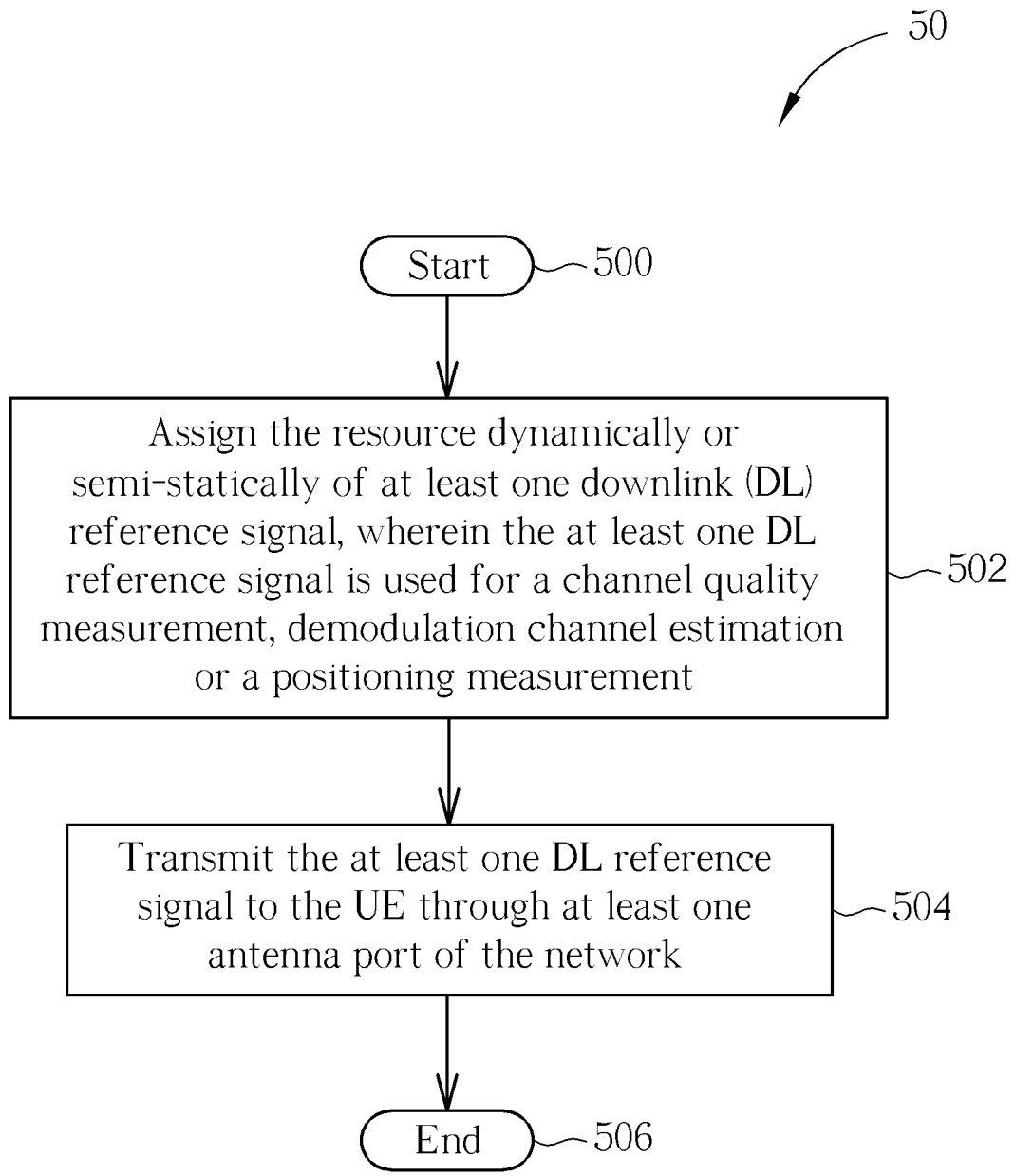
FIG. 5 is a flowchart of a process according to an example of the present disclosure.

Please refer to FIG. 5, which is a flowchart of a process 50 according to an example of the present disclosure. The process 50 is used for handling downlink signaling for a network in a wireless communications system. Preferably, the wireless communications system can be referred as to the wireless communications system 10 and includes the network and a UE. The process 50 may be complied into the program code 214 and includes the following steps:

Step 500: Start.

Step 502: Assign resource dynamically or semi-statically of at least one downlink (DL) reference signal, wherein the at least one DL reference signal is used for a channel quality measurement, demodulation channel estimation or a positioning measurement.

Step 504: Transmit the at least one DL reference signal to the UE through at least one antenna port of the network.

Step 506: End.

According to the process 50, the network may assign (e.g. dynamically and/or semi-statically) the resource (time and/or frequency resource) to one or more DL reference signals and transmit one or more DL reference signals to the UE through one or more antenna ports. The one or more DL reference signals may be used for a channel quality measurement, demodulation channel estimation or a positioning measurement. Thus, the network can reduce signaling resource for channel quality measurement and to save time to read positioning configuration or wait for positioning reference signal opportunity. In addition, the network may configure an association of the antenna port of the UE with the DL reference signal or the frequency carrier or the cell. The detailed description of the process 50 could be found above, and thus omitted herein.

Figure 6:
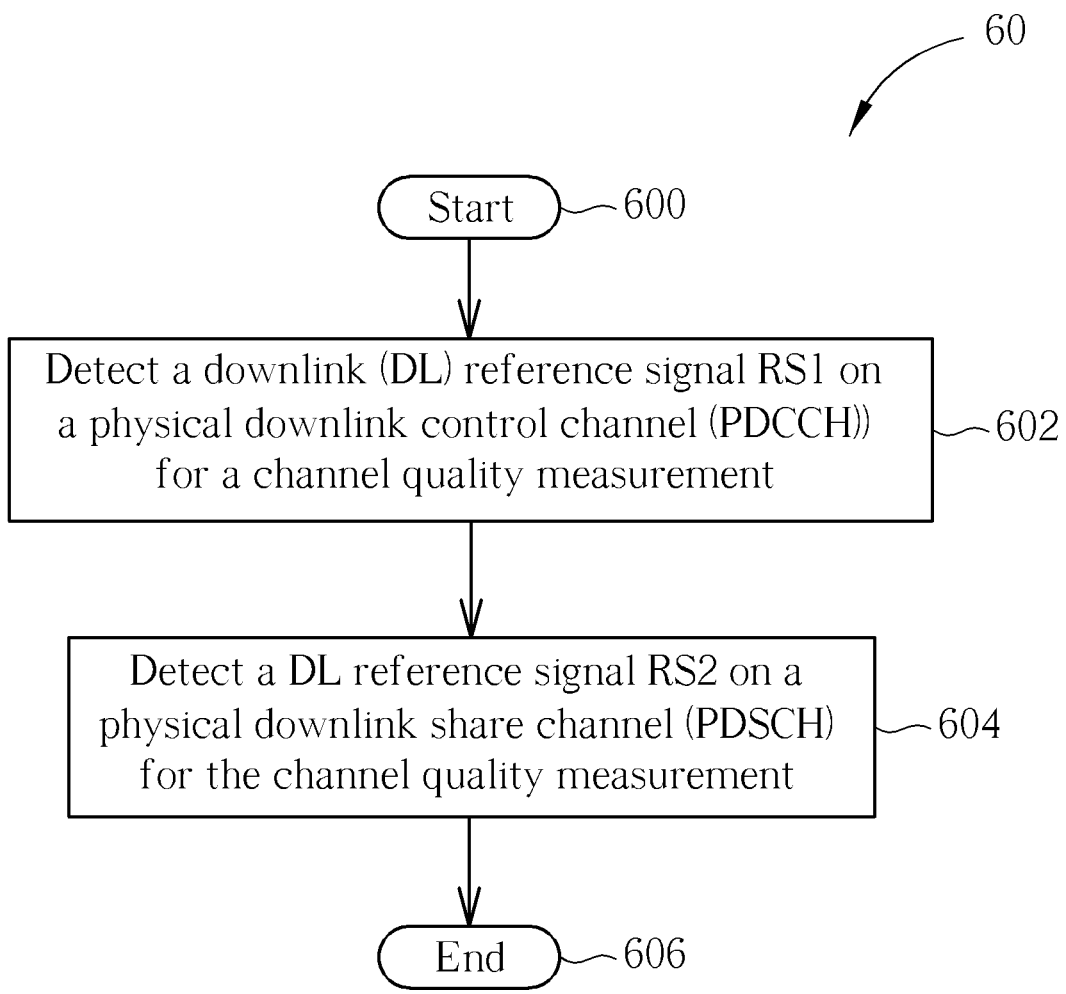
FIG. 6 is a flowchart of a process according to an example of the present disclosure.

Please refer to FIG. 6, which is a flowchart of a process 60 according to an example of the present disclosure. The process 60 is used for handling downlink signaling for a UE in a wireless communications system. Preferably, the wireless communications system can be referred as to the wireless communications system 10 and includes the network and a UE. The process 60 may be complied into the program code 214 and includes the following steps:

Step 600: Start.

Step 602: Detect a DL reference signal RS1 on a physical downlink control channel (PDCCH)) for a channel quality measurement Step 604: Detect a DL reference signal RS2 on a physical downlink share channel (PDSCH) for the channel quality measurement.

Step 606: End.

According to the process 60, the UE may detect the DL reference signal RS1 on the PDCCH first and then detect the DL reference signal RS2 on the PDSCH. Preferably, the DL reference signal RS1 and the DL reference signal RS2 may be two different DL reference signal or two different parts of single DL reference signal. In some examples, the DL reference signals RS1 and RS2 may be referred as to a channel state information-reference signal (CSI-RS). The CSI-RS aims at CSI measurement only to improve measurement accuracy in the LTE-A system. Since the PDCCH uses lower power for transmission than the PDSCH does, it is easier and more critical to detect the DL reference signal (CSI-RS) on the PDCCH (less interfered by other DL reference signals). Therefore, in contrast to the prior art, both of the PDCCH and the PDSCH can be used for detection of the DL reference signal.

After the DL reference signals R1 and R2 are detected and measured on the PDCCH and the PDSCH, respectively, the UE should report a measurement result M1 associated with the DL reference signal R1 and a measure result M2 associated with the DL reference signal R2 to the network. The measurement results M1 and M2 are calculated according to transmission periods of the DL reference signals R1 and R2, respectively. Beside, the DL reference signal R1 on the PDCCH may use a resource block pattern and period different from those used by the DL reference signal R2 on the PDSCH. In other words, the DL reference signals RS1 on the PDCCH has a different pattern or period from the DL reference signals RS2 on the PDSCH. In this situation, the measurement result M1 and the measurement result M2 are calculated separately at the corresponding transmission timing of transmission periods of the DL reference signal RS1 and the DL reference signal RS2, respectively.

Figure 7:
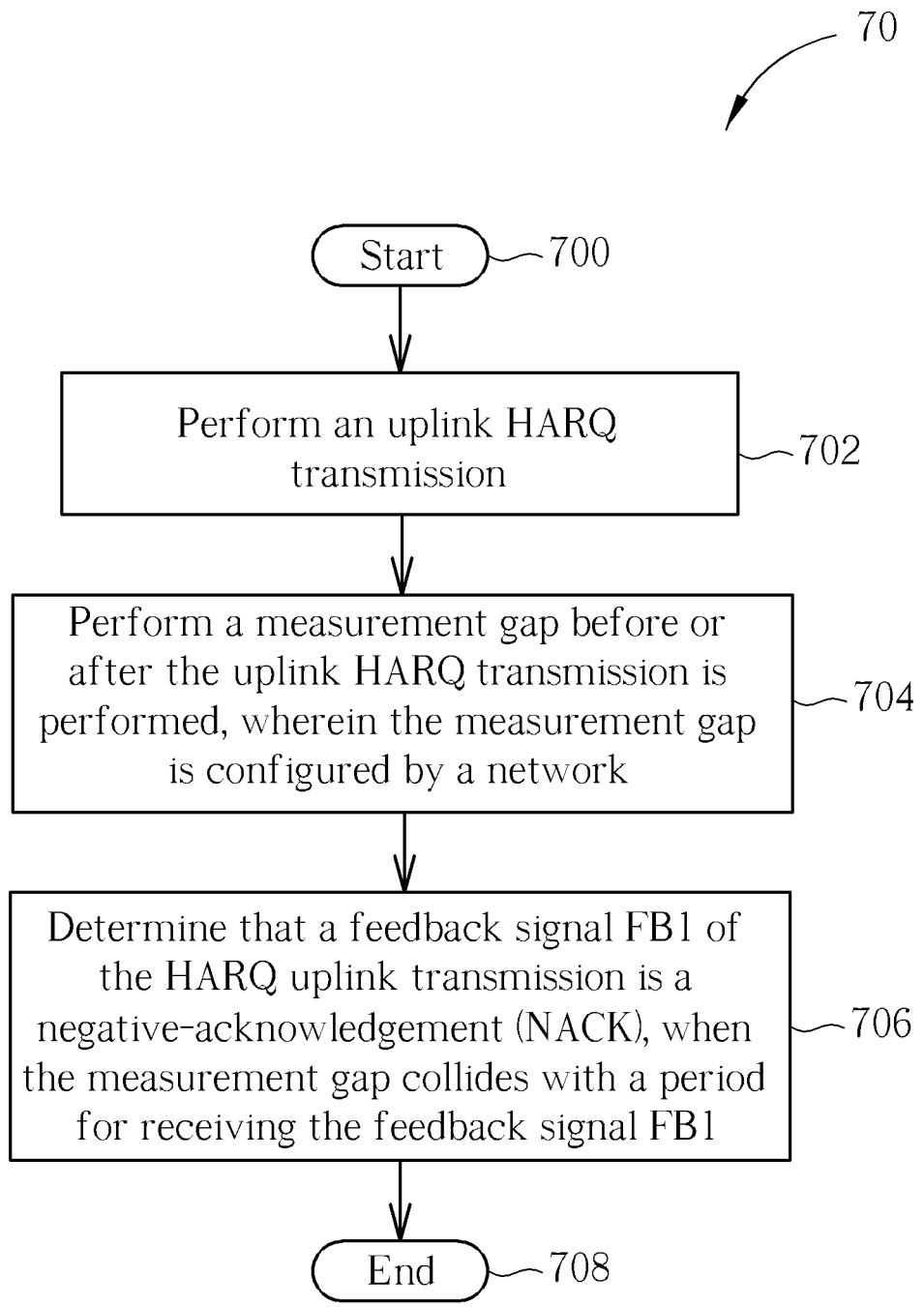
FIG. 7 is a flowchart of a process according to an example of the present disclosure.

Please refer to FIG. 7, which is a flowchart of a process 70 according to an example of the present disclosure. The process 70 is used for handling downlink signaling for a UE in a wireless communications system. Preferably, the wireless communications system can be referred as to the wireless communications system 10 and the UE is operated in a half-duplex mode. The process 70 may be complied into the program code 214 and includes the following steps:

Step 700: Start.

Step 702: Perform an uplink HARQ transmission.

Step 704: Perform a measurement gap before or after the uplink HARQ transmission is performed, wherein the measurement gap is configured by a network.

Step 706: Determine that a feedback signal FB1 of the HARQ uplink transmission is a negative-acknowledgement (NACK), when the measurement gap collides with a period for receiving the feedback signal FB1.

Step 708: End.

According to the process 70, the UE may perform the uplink HARQ transmission. When the UE receives the measurement gap before or after the uplink HARQ transmission, the UE may determine that the feedback signal FB1 is the NACK due to the measurement gap. The measurement gap may be configured before or after the uplink HARQ transmission. In other words, when the measurement gap collides with a reception period of the feedback signal FB1 or keeps the UE from receiving the feedback signal FB1, the UE may determine that the feedback signal FB1 is the NACK. The uplink HARQ transmission may be referred as an initial transmission or a retransmission. In other words, the network may not send the feedback signal FB1 to the UE during the measurement gap, or the UE may not expect to receive the feedback signal FB1 during the measurement gap.

In addition, the UE may consider that a retransmission corresponding to the HARQ uplink transmission is needed, when the mobile device UE detects or determines that the feedback signal FB1 is the NACK, or considers previous transmission or retransmission of the uplink HARQ transmission not successful. The measurement gap may further occult the retransmission of the HARQ uplink transmission. In this situation, the UE may determine that a feedback signal FB2 of the retransmission is the NACK. In some examples, the UE may determine the feedback signal FB2 of the retransmission according to a previously received feedback (e.g. the feedback signal FB1) and/or a PDCCH indication. On the other hand, the UE increments the number of transmission trail of the uplink HARQ transmission to a transmission counter by at least one according to timing of the HARQ uplink transmission or retransmission occulted within the measurement gap or the expected timing of the feedback signal of the UL HARQ transmission or retransmission within the measurement gap.

Figure 8:
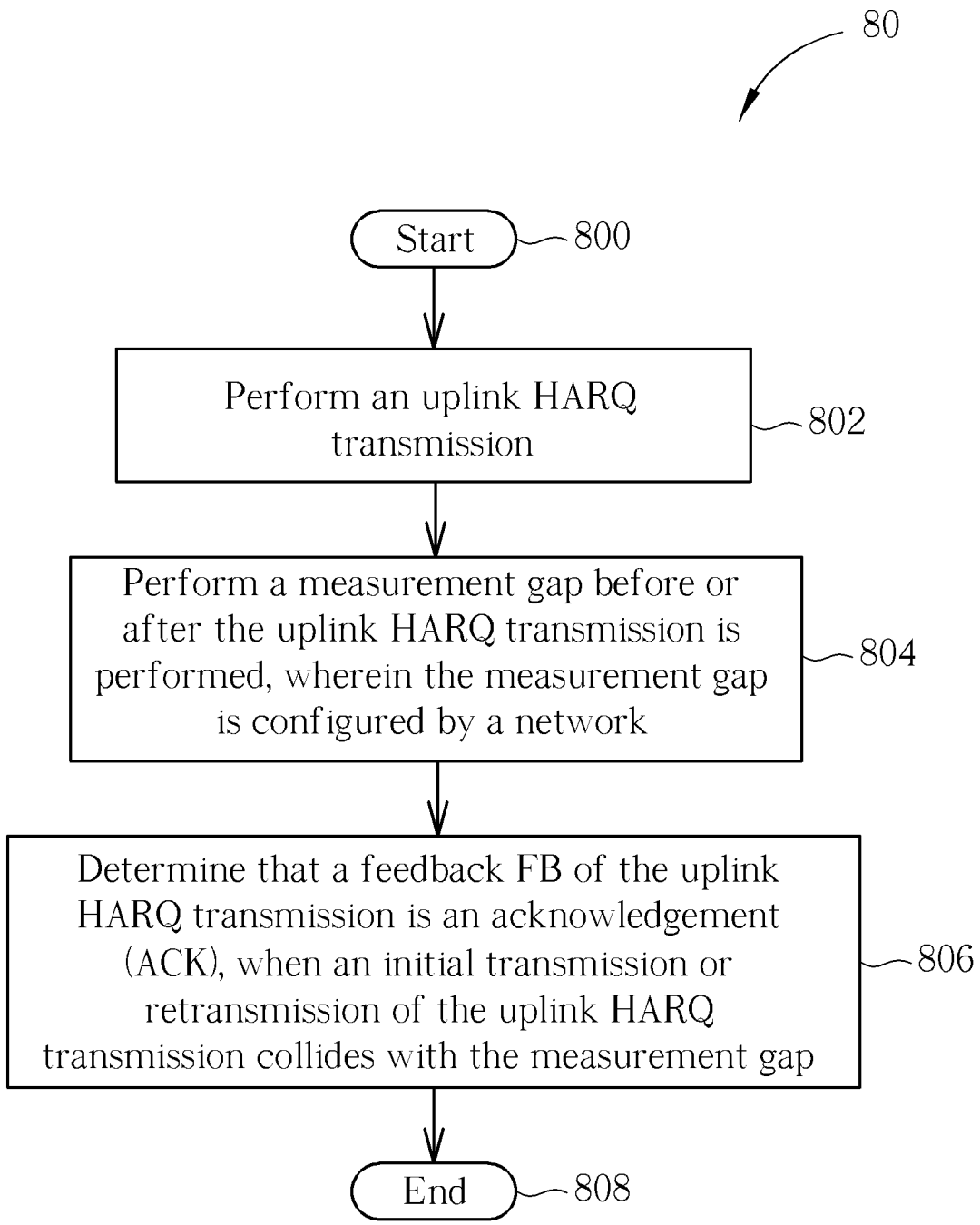
FIG. 8 is a flowchart of a process according to an example of the present disclosure.

Please refer to FIG. 8, which is a flowchart of a process 80 according to an example of the present disclosure. The process 80 is used for handling downlink signaling for a UE in a wireless communications system. Preferably, the wireless communications system can be referred as to the wireless communications system 10 and the UE is operated in a half-duplex mode. The process 70 may be complied into the program code 214 and includes the following steps:

Step 800: Start.

Step 802: Perform an uplink HARQ transmission.

Step 804: Perform a measurement gap before or after the uplink HARQ transmission is performed, wherein the measurement gap is configured by a network.

Step 806: Determine that a feedback FB of the uplink HARQ transmission is an acknowledgement (ACK), when an initial transmission or retransmission of the uplink HARQ transmission collides with the measurement gap.

Step 808: End.

According to the process 80, the UE may perform the uplink HARQ transmission. When the initial transmission or retransmission of the uplink HARQ transmission collides with the measurement gap, the UE may determine that the feedback FB of the uplink HARQ transmission is the ACK. In other words, when the measurement gap collides with the initial transmission, the UE may perform the uplink HARQ transmission whether the network receives it or not.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the abovementioned processes and the processed results can handling downlink signaling in the wireless communications system 10.

To sum up, according to examples of the present disclosure, the network may dynamically assign resource (e.g. time and frequency) for the DL reference signals for the channel quality measurement or the positioning measurement. This can reduce signaling resource for the channel quality measurement, and save time to read positioning configuration or wait for positioning reference signal opportunity. Beside, for the channel quality measurement, the UE may measure the CSI-RSs on the PDCCH and the PDSCH, respectively. The measurement results are more considerable and reliable base on the CSI-RSs on the PDCCH and the PDSCH. In addition, when the UE is operated in the half-duplex mode, the UE may receive the measurement gap after the uplink transmission takes place. If the UE cannot receive the feedback of the uplink transmission due to the measurement gap, the UE should determine that the feedback of the uplink transmission is NACK.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of handling downlink signaling for a mobile device in a wireless communications system, the method comprising:
   detecting a first downlink (DL) reference signal or a first part of a DL reference signal on a physical downlink share channel (PDSCH) for a channel quality measurement;
   detecting a second DL reference signal or a second part of a DL reference signal on a physical downlink control channel (PDCCH) for the channel quality measurement before the detection of the first DL reference signal on the PDSCH is performed;
   reporting a first measurement result of the channel quality measurement for the PDSCH when the first DL reference signal or the first part of the DL reference signal is detected; and
   reporting a second measurement result of the channel quality measurement for the PDCCH when the second DL reference signal or the second part of the DL reference signal is detected.

2. The method of claim 1, wherein the first measurement result and the second measurement result are calculated based on transmission periods of the first DL reference signal or the first part of the DL reference signal and the second DL reference signal or the second part of the DL reference signal, respectively.

3. The method of claim 1, wherein the second DL reference signal or the second part of the DL reference signal on the PDCCH has a different pattern or period from the first DL reference signal or the first part of the DL reference signal.

4. The method of claim 3, wherein the first measurement result and the second measurement result are calculated separately at the corresponding transmission timing of transmission periods of the first DL reference signal and the second DL reference signal, respectively.

* * * * *